Aug. 14, 1945.  J. S. ALFORD  2,382,387
GAS TURBINE
Filed Dec. 3, 1942   2 Sheets-Sheet 1
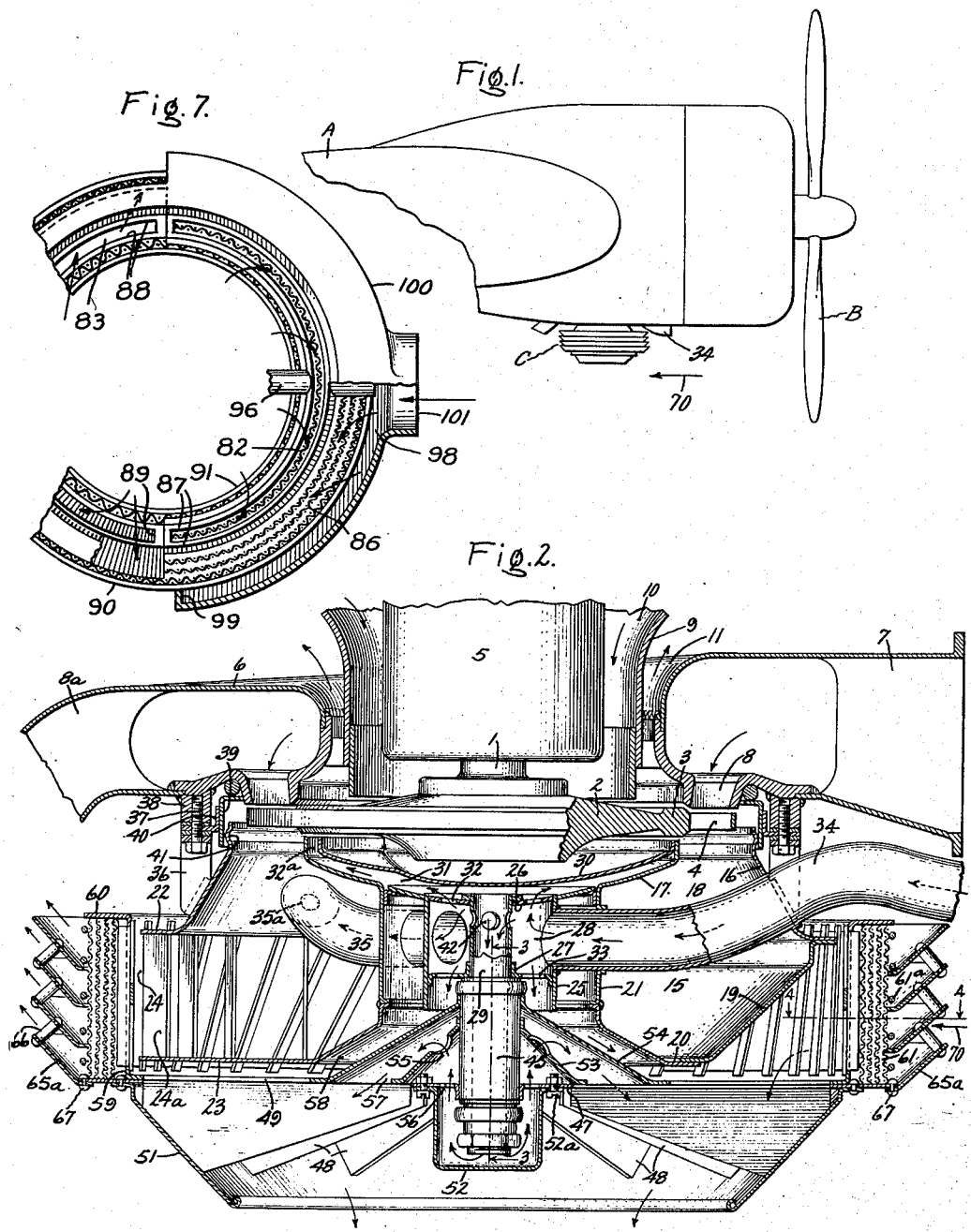
Inventor:
Joseph S. Alford,
by Harry E. Dunham
His Attorney.

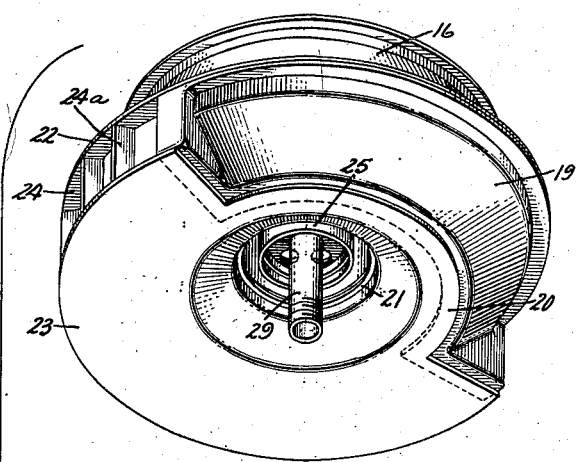
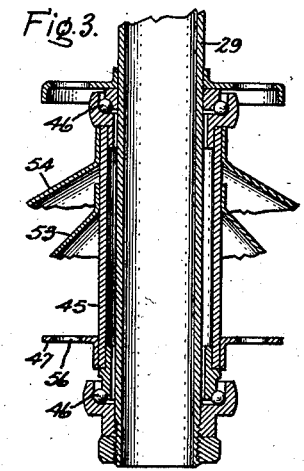
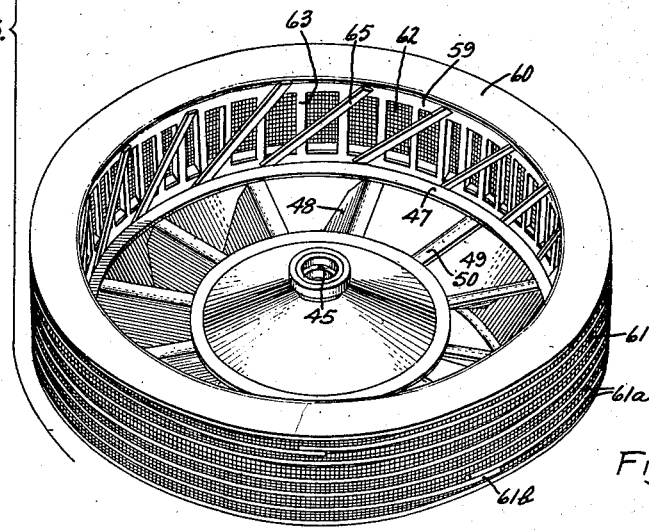
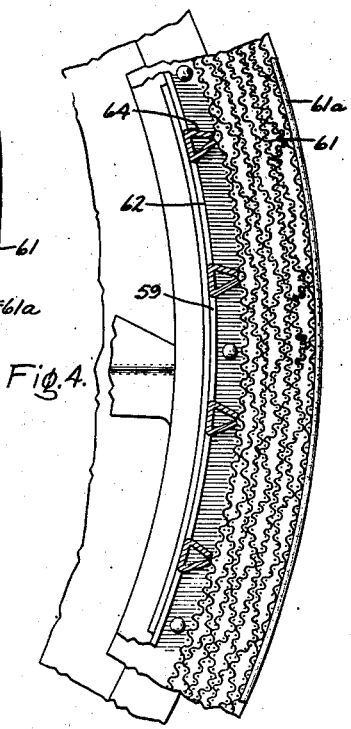
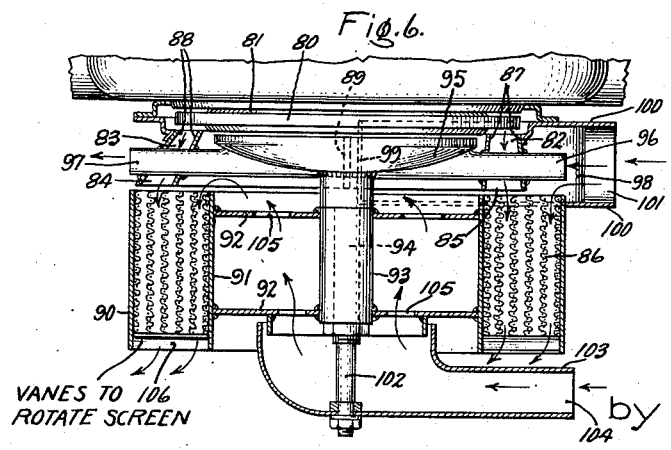

Patented Aug. 14, 1945

2,382,387

UNITED STATES PATENT OFFICE 2,382,387

GAS TURBINE

Joseph S. Alford, Nahant, Mass., assignor to General Electric Company, a corporation of New York Application December 3, 1942, Serial No. 467,734

7 Claims. (Cl. 60—13)

The present invention relates to gas turbines. The invention is especially useful in gas turbines for aircraft wherein the turbine is operated by exhaust gases from an aircraft engine, although it is not limited thereto.

In the operation of turbines from engine exhaust gases, there are times when the hot exhaust gases contain unconsumed fuel. When mixed with air upon leaving the turbine wheel, this unconsumed fuel may be ignited causing what is termed "after-burning," a thing which is objectionable because of wheel heating and for other reasons.

The object of my invention is to provide in a gas turbine an improved construction and arrangement for cooling the exhaust gases as they leave the turbine wheel so as to prevent after-burning, and also for cooling the wheel itself.

For a consideration of what I believe to be novel and my invention, attention is directed to the following specification and the claims appended thereto.

In the drawings, Fig. 1 is a side elevation of an aircraft having a gas turbine embodying my invention, it being in the present instance a part of a turbosupercharger; Fig. 2 is a sectional view through a structure embodying my invention; Fig. 3 is a detail view on an enlarged scale taken on line 3—3 of Fig. 2; Fig. 4 is a detail sectional view on an enlarged scale taken on line 4—4, Fig. 2; Fig. 5 is an exploded perspective view of stationary and rotating parts which are utilized in carrying out my invention; Fig. 6 is a sectional view of a modification, and Fig. 7 is a detail sectional view of structure illustrated in Fig. 6.

Referring to the drawings, Fig. 1, A indicates an aircraft having an engine which drives propeller B, and C indicates a turbosupercharger mounted in the nacelle of the aircraft.

Referring now to Figs. 2 to 5 of the drawings, 1 indicates a shaft on which is mounted a turbine wheel comprising a web 2, a rim 3 and a ring of buckets 4. Shaft 1 is carried in a bearing 5. Surrounding bearing 5 in spaced relation thereto is an annular nozzle box 6 having an inlet 7, a ring of nozzles 8 through which gases are discharged to the ring of buckets 4, and a waste conduit 8ª in which is located the usual waste gate valve (not shown) for controlling flow of gases to the bucket ring. Located in the space between bearing 5 and nozzle box 6 is a curved partition wall 9 which defines an annular inlet passage 10 through which cooling air flows to cool the bearing and the rear side of the turbine wheel and an annular passage 11 through which cooling air is discharged. Cooling air for passage 10 may be taken from any suitable source; in the case of an aircraft, from the slip stream, for example.

The structure so far described is a known one, it being a part of a turbosupercharger such as is used on aircraft for supercharging an aircraft engine. (See, for example, patent to Clarke 2,269,181, January 6, 1942.) The nozzle box is supported usually from the compressor casing (not shown), the compressor casing in turn being fixed to the supporting structure which carries the turbosupercharger.

On the discharge side of the turbine wheel are walls forming an annular chamber 15 to which gases exhausted from the ring of buckets flow and from which they are discharged to atmosphere. The inlet to chamber 15 is formed by two spaced walls 16 and 17 which form an outwardly flared passage 18. Attached to walls 16 and 17 are enclosing walls 19, 20 and 21 which form one-half of chamber 15. The other half of chamber 15 is defined by two axially spaced walls 22 and 23 which serve also to define a semi-cylindrical discharge opening 24 through which gases are discharged from chamber 15 to atmosphere. The outer edges of walls 22 and 23 are connected together by spaced vanes 24ª suitably fastened to the walls. Inside wall 21 and radially spaced therefrom is a cylindrical wall 25 provided with heads 26 and 27 which serve to define a cooling air chamber 28. Supported in heads 26 and 27 is a fixed tubular shaft 29 which at one end, the lower end in Fig. 2, projects beyond wall 25. Attached to the periphery of wall 17 is a dish-shaped circular wall 30 which in conjunction with wall 17 forms a cooling air chamber 31. In head 26 are spaced cooling air openings 32 through which cooling air flows to chamber 31. Over a portion of their periphery the edges of walls 17 and 30 are spaced to define passages 32ª through which air is discharged from chamber 31 against the rim of the turbine wheel for cooling it. Passages 32ª may cover, for example, an arc of 90°. Passages 32ª may be formed by crimping the periphery of wall 30 against wall 17 at spaced points. Walls 17 and 30 form a cooling cap for wheel 2, functioning to protect the web of the wheel from hot gases discharged from the bucket ring and to discharge cooling air against the rim of the wheel through passages 32ª. In head 27 are spaced openings 33 for the flow of cooling air. Extending through walls 16, 21 and 25 is a cooling air inlet conduit 34 which conveys cooling air to chamber 28.

Also, connected with chamber 28 and extending out through walls 25 and 21 are a plurality (two in the present instance) of tubular supporting posts 35. The several walls which go to make up chambers 15 and 28 are suitably welded together and to conduit 34 and posts 35 to form a single unitary structure. The outer ends of posts 35 are fixed to wall 16 and such ends are provided with openings 35ᵃ so that sufficient cooling air can circulate through the posts to cool them. This unitary structure is attached to the nozzle box by a number of circumferentially spaced brackets 36 which at one end are suitably welded to wall 16 and at the other end are connected by bolts 37 to bosses 38 formed on the nozzle box. Bolts 37 support also an L-shaped ring 39 by means of ears 40 welded to ring 39 and with which the inner end of wall 16 has a sliding fit, the wall being formed preferably with an outwardly struck bead 41 which engages the inner surface of ring 39. This serves as a seal between the nozzle box and chamber 15, preventing the escape of exhaust gases between wall 16 and the nozzle box. Also, it forms an axially slidable connection between the nozzle box and the walls which form chamber 15 so as to permit relative expansion and contraction of parts to take place. In fixed shaft 29 are cooling air passages 42.

As will be seen from Fig. 5, discharge opening 24 covers an arc of about 180°. The exhaust gases from the turbine wheel discharge to chamber 15 and are turned by the walls forming the chamber and discharged through opening 24.

Rotatably mounted on the end of shaft 29 is a bearing sleeve 45, the same being supported in suitable ball-bearings 46, see Fig. 3. Attached to sleeve 45 by suitable means, such as by welding, is a disk 47 from which is struck out a plurality of spaced vanes 48 which are bent to a suitable angle. This provides openings 49 for the flow of cooling air. The vanes are suitably spaced apart, the strip of material between adjacent vanes being indicated at 50 in Fig. 5. The outer ends of vanes 48 are tapered inwardly and fastened over them is a conical shield 51 which is suitably riveted to disk 47 at its periphery. Over the outer end of shaft 29 is a cap 52 which is attached to disk 47 by bolts 52ᵃ and serves to house the end of the shaft. Attached to sleeve 45 at one end and to disk 47 at the other end by welding or other suitable means are two spaced conical plates 53 and 54, plate 53 being provided with circumferentially spaced openings 55. The space between plate 53 and disk 47 is connected with the interior of cap 52 by a plurality of spaced openings 56 in disk 47. Plates 53 and 54 define an annular air discharge passage 57. The space between plate 54 and wall 20 defines an annular air discharge passage 58.

Attached to the peripheral portion of disk 47 is an annular axially extending wall 59 having a radially extending flange 60 which with the peripheral portion of disk 47 forms an annular space in which is located a cooler or heat exchanger 61. In the present instance, the cooler or heat exchanger is in the form of a strip of screening material wound upon itself to form a screen of suitable thickness, although suitable material other than screening may be used. For fixing the screen in place, there are provided a number of spaced wire bands 61ᵃ which surround the screen and have their ends lapped and fixed together as shown at 61ᵇ, Fig. 5. Annular wall 59 is provided with spaced rectangular openings 62 which define connecting strips 63. The material struck out to form openings 62 is bent up into cone shape, as is indicated at 64 in Fig. 4, to define spaced projections upon which the screen 61 is wound. To strengthen the structure, angular braces 65, as shown particularly in Fig. 5, are suitably welded to strip 63 and the material at the edges of openings 64.

Attached to the peripheral edge of disk 47 is an annular structure comprising a number of annular shields 65ᵃ fastened together by spacers 66. The structure is attached to disk 47 by suitable means as is indicated at 67.

The foregoing forms a unitary structure which is rotatably mounted on fixed shaft 29 and which provides a screen 61 which completely surrounds the stationary structure already described.

The structure may be mounted in an aircraft as is indicated in Fig. 1, the arrangement being such that exhaust gas opening 24 faces in the direction of flow of the slip stream while the structure opposite it faces into the slip stream so that cooling air flows through the screen from the outside toward the inside. In Figs. 1 and 2 the arrows 70 indicate the direction of flow of the slip stream.

In operation, exhaust gases from the ring of buckets 4 are discharged to chamber 15 from which they flow out through opening 24 and the portion of screen 61 over the opening to atmosphere. Vanes 24ᵃ are shaped to direct the exhaust gases against the screen at an angle and in a direction tending to rotate the screen. At the same time air from the slip stream flows in through screen 61 and is directed by sloping wall 19 out through openings 49 and against vanes 48 to effect rotation of the screen. At the same time, the air in flowing through the screen cools it.

In the present instance, I utilize both air from the slip stream and the exhaust gases for effecting rotation of the screen, both being available sources. It will be understood, however, that such rotation may be effected by either alone.

Cooling air from a suitable source, such as from the slip stream in the case of an aircraft, flows through conduit 34 to cooling chamber 28. From here a part of the air flows through openings 32 in head 26 to the interior of the cooling cap (chamber 31) and thence out through openings 32ᵃ to cool the rim of the wheel. Other air flows through openings 33 in head 27 out through annular passage 58 and openings 49, discharging against vanes 48 to assist in rotating the screen. Also air from chamber 28 flows through openings 42 to the interior of shaft 29, thence out of the end of the shaft and back through openings 56 and 55 to passage 57 whence it is discharged against vanes 48. The air brought in through conduit 34 has for its main function the cooling of the several parts of the stationary structure.

As the screen rotates, a part of it (in the present instance one-half) is continuously subjected to the action of cooling air while another part (in the present instance the other half, the half in line with discharge opening 24) has the exhaust gases flowing through it to atmosphere. As a result, the exhaust gases flow always through cooled screen, the cooling effect being sufficient to prevent the screen at any time reaching a temperature sufficiently high to effect ignition of any unconsumed fuel when the exhaust gases mingle with the atmosphere. In an arrangement of this type wherein gases are flowing through a screen, combustion will not be supported on the inside of the screen and by the time the gases have passed through the screen, they have been cooled to an extent such that combustion will not be supported on the outside of the screen.

It will be noted that in operation the cooling air flows from the outside of the screen toward the inside and that the exhaust gases flow from the inside of the screen toward the outside. This gives counterflow for the cooling air and the gases. The outer portion of the screen will be the coolest and will be first engaged by the cooling air while the inner portion of the screen will be at the highest temperature and will be first engaged by the hot gases. This arrangement gives the most efficient cooling action.

In Fig. 6 there is illustrated a modified construction wherein there is provided on the discharge side of the bucket ring 80 of the turbine wheel 81 walls which define two paths 82 and 83 for the flow of exhaust gases, each path extending over one-half of the bucket ring, the one path 83 being sloped radially outward so that its discharge arc 84 is farther from the shaft axis than the discharge arc 85 of path 82; and in connection therewith is an annular rotating cooler or heat exchanger 86 which moves in front of the two discharge arcs and is preferably in the form of a screen, being formed from suitable screening material. The screen is of a radial depth such that it spans both discharge arcs and has associated therewith means for rotating it and for effecting flow of cooling air through those portions of the screen which at any time are not in line with the two discharge arcs 84 and 85. Path 82 is formed by two spaced walls 87 which extend through an arc of 180°. Its discharge arc 85 is in line with the radial inner half of rotating screen 86. Path 83 is formed by two outwardly flaring spaced walls 88 which extend through the remaining arc of 180°. Its discharge arc 84 is in line with the radial outer half of rotating screen 86. The division between paths 82 and 83 is indicated at 89.

Rotating screen 86 is carried between two annular walls 90 and 91 supported by two disks 92 which in turn are suitably welded to a hub 93. Hub 93 is rotatably mounted on a stationary shaft 94 carried by a cooling cap 95 which is suitably supported in front of the turbine wheel and which may be similar in structure to the cooling cap comprising walls 17 and 30 and shown in Fig. 2. Cooling air enters the cooling cap through a conduit 96 and is discharged therefrom through a conduit 97. Surrounding outer wall 87 in spaced relation thereto is a curved wall 98, the radial inner end of which is indicated at 99. Wall 98 together with side walls 100 define a semi-circular cooling air directing chamber for directing cooling air to the outer peripheral portion of rotating screen 86. The chamber formed by walls 98 and 100 is provided with an inlet 101 which may face in the direction of the slip stream of the aircraft or be suitably arranged to receive air from the slip stream. Stationary shaft 94 is provided with an extension 102 on which is fastened a scoop 103 having an open end 104 which may face into the slip stream or which may be suitably arranged to receive air from the slip stream. Scoop 103 receives cooling air and directs it through passages 105 in walls 92 to the inner radial portion of screen 86. As shown in Fig. 6, cooling air is directed through the radial outer half of screen 86 through an arc covering 180° on the right hand side of Fig. 6, and cooling air is directed through the radial inner half of screen 86 through an arc which covers 180° on the left hand side of Fig. 6. As the screen rotates, considering the right hand half, the radial outer portion is being cooled by cooling air passing therethrough and the radial inner portion is being utilized to cool exhaust gases passing therethrough, while in the case of the left hand half, the radial outer portion is being utilized to cool exhaust gases passing therethrough while the radial inner half is being cooled by cooling air passing therethrough. Rotation of the screen may be effected in any suitable way. In the present instance, the screen on its discharge side is shown as being provided with vanes 106 against which the cooling air and exhaust gases discharge to effect rotation.

By my invention, it will be seen that I provide in connection with the turbine wheel a cooling member through which the exhaust gases pass on their way from the turbine wheel to atmosphere and means for moving the cooling member relatively to the path of flow of the exhaust gases whereby at all times exhaust gases are flowing through one portion of the cooling member and cooling medium through another portion thereof; each portion of the cooling member being alternately subjected to the action of the gases and the cooling medium.

A construction embodying my invention is relatively light in weight, a thing of especial importance in the case of aircraft, reliable in operation, and capable of being manufactured at low cost.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. The combination with an aircraft having an engine, of walls forming an exhaust housing located in the path of flow of the aircraft slip stream, said housing having an exhaust opening on the down stream side of the housing, a movable cooler for the exhaust gases which surrounds said housing and is adapted to rotate over said exhaust opening, means for effecting flow of cooling air over said cooler, and means actuated by the slip stream air flow for effecting rotation of said cooler.

2. The combination with an aircraft having an engine, of walls forming an exhaust housing located in the path of flow of the aircraft slip stream, said housing having an exhaust opening on the down stream side of the housing, a movable cooler for the exhaust gases which surrounds said housing and is adapted to rotate over said exhaust opening, means for effecting flow of cooling air in radially inward direction through said cooler towards a portion of the exhaust housing substantially diametrically opposite its exhaust opening, and means including a plurality of circumferentially spaced blades secured to the cooler and actuated by the exhaust gases for effecting rotation of said cooler.

3. The combination with an aircraft having an engine and a turbosupercharger driven by exhaust gases from the engine, of an exhaust housing for the turbosupercharger having an annular wall with an exhaust opening, a cooling screen which surrounds the housing and is mounted to rotate across said exhaust opening, whereby exhaust gases pass radially outward from the exhaust opening through the cooler, means located substantially diametrically opposite the exhaust opening for forcing cooling air radially inward through said cooling screen, said cooler having axial discharge openings for the cooling air.

4. The combination with an aircraft having an engine and a turbosupercharger driven by exhaust gases from the engine, of an exhaust housing for the turbosupercharger located in the path of flow of the aircraft slip stream and having an exhaust opening on the down stream side of the housing, a cooling screen which surrounds the housing and is mounted to rotate across said exhaust opening, said cooling screen on its up stream side being in the path of flow of the slip stream, and means actuated by slip stream air flow for effecting rotation of said cooling screen.

5. The combination with an aircraft having an engine and a turbosupercharger driven by exhaust gases from the engine, of an exhaust housing for the turbosupercharger having a lateral exhaust opening, a rotatably mounted cooling screen which concentrically surrounds said housing and is adapted to pass across said exhaust opening, means for effecting flow of cooling medium radially inward over a portion of the screen remote from said exhaust opening, and means actuated by flow of exhaust gases for effecting rotation of said screen, said means including a plurality of circumferentially spaced blades secured to the inner surface of the screen and fluid directing vanes located in said exhaust opening.

6. The combination with an aircraft having an engine and a gas turbine driven by exhaust gases from the engine, of an exhaust housing with a conical wall for the gas turbine located in the path of flow of the aircraft slip stream and having an exhaust opening on the downstream side of the housing, a shaft located centrally of said housing, a cooling screen which surrounds the housing and is journaled on said shaft to rotate across said exhaust opening, said cooling screen on its upstream side being in the path of flow of the slip stream whereby cooling air is forced radially into the screen towards the conical wall of the exhaust housing, means defining conduits for conveying slip stream air to said journal to cool it, and means actuated by fluid flow for rotating said cooling screen comprising a fan secured to the screen and having blades located in the path of cooling fluid deflected from said conical wall.

7. The combination with a gas turbine for an aircraft comprising a turbine wheel having a cooling cap, an axially extending shaft carried by the cooling cap, walls forming an exhaust housing located in the path of flow of the aircraft slip stream, said housing having an exhaust opening on the downstream side of the housing, a cooler for the exhaust gases removably mounted on said shaft for rotation thereon which surrounds said housing and rotates over said exhaust opening, and means actuated by fluid flow for rotating said cooler.

JOSEPH S. ALFORD.